US009160912B2

(12) United States Patent
Liang et al.

(10) Patent No.: US 9,160,912 B2
(45) Date of Patent: Oct. 13, 2015

(54) SYSTEM AND METHOD FOR AUTOMATIC IMAGE CAPTURE CONTROL IN DIGITAL IMAGING

(71) Applicant: Apple Inc., Cupertino, CA (US)

(72) Inventors: Yongfang Liang, Mountain View, CA (US); Munehiro Mori, San Jose, CA (US); Haitao Guo, San Jose, CA (US); Ting Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 13/628,558

(22) Filed: Sep. 27, 2012

(65) Prior Publication Data

US 2013/0329075 A1 Dec. 12, 2013

Related U.S. Application Data

(60) Provisional application No. 61/657,281, filed on Jun. 8, 2012.

(51) Int. Cl.
*H04N 5/222* (2006.01)
*H04N 5/225* (2006.01)
*H04N 5/232* (2006.01)
*H04N 5/235* (2006.01)
*H04N 5/228* (2006.01)

(52) U.S. Cl.
CPC ........... *H04N 5/2256* (2013.01); *H04N 5/2358* (2013.01); *H04N 5/23235* (2013.01); *H04N 5/23245* (2013.01); *H04N 5/23293* (2013.01)

(58) Field of Classification Search
USPC .............................................. 348/222.1, 294
See application file for complete search history.

(56) References Cited

U.S. PATENT DOCUMENTS

| 5,991,465 | A | 11/1999 | Anderson et al. |
| 7,091,466 | B2 | 8/2006 | Bock |
| 7,465,908 | B2 * | 12/2008 | Kishida ...................... 250/201.3 |
| 7,719,579 | B2 | 5/2010 | Fishman et al. |
| 7,773,127 | B2 | 8/2010 | Zimmer et al. |
| 7,903,871 | B2 | 3/2011 | Kaplinsky et al. |
| 8,130,278 | B2 * | 3/2012 | Border et al. .............. 348/208.6 |

(Continued)

FOREIGN PATENT DOCUMENTS

| EP | 2 277 447 A1 | 1/2011 |
| WO | WO-0180550 A2 | 10/2001 |

OTHER PUBLICATIONS

PCT International Search Report and Written Opinion of the International Searching Authority for PCT/US2013/039318, mailed Oct. 15, 2013.

(Continued)

*Primary Examiner* — Ngoc-Yen Vu
(74) *Attorney, Agent, or Firm* — Blakely, Sokoloff, Taylor & Zafman LLP

(57) ABSTRACT

A method for automatic image capture control and digital imaging is described. An image buffer is initialized to store a digital image produced by an image sensor, through allocation of a region in memory for the buffer that is large enough to store a full resolution frame from the image sensor. While non-binning streaming frames, from the sensor and in the buffer, are being displayed in preview, the sensor is reconfigured into binning mode, and then binned streaming frames are processed in the buffer, but without allocating a smaller region in memory for the buffer. Other embodiments are also described and claimed.

15 Claims, 6 Drawing Sheets

(56) References Cited

U.S. PATENT DOCUMENTS

| | | | |
|---|---|---|---|
| 2006/0171023 A1 | 8/2006 | Kishida | |
| 2009/0160968 A1 | 6/2009 | Prentice et al. | |
| 2010/0086227 A1* | 4/2010 | Sun et al. | 382/254 |
| 2010/0220216 A1 | 9/2010 | Fishman et al. | |
| 2011/0090380 A1 | 4/2011 | Côté et al. | |
| 2011/0211749 A1* | 9/2011 | Tan et al. | 382/154 |
| 2011/0298947 A1 | 12/2011 | Guo et al. | |
| 2012/0242853 A1 | 9/2012 | Jasinski et al. | |

OTHER PUBLICATIONS

PCT Invitation to Pay Additional Fees for corresponding International Application No. PCT/US2013/039318, mailing date Jul. 19, 2013, 5 pages.

"Binning", The cooKe corporation | pco. imaging, Feb. 2005, Kelheim, Germany, (2 pages).

"Point Grey Research Knowledge Base", Article 141—Avoiding dropped or missed images using PGR FlyCapture, May 26, 2012, Point Grey :: Product Support :: Printable Knowledge Base Article, Internet article at: http://www.ptgrey.com/support/kb/printable.asp?q=141, (2 pages).

Huang, Hong-Yi, et al., "CMOS Image Sensor Binning Circuit for Low-Light Imaging", Industrial Electronics and Applications (ISIEA), 2011 IEEE, Symposium on Sep. 25-28, 2011, (pp. 586-589).

Wilson, Andrew, "Binning Techniques Increase Signal-to-Noise Ratio in CMOS Imagers", andyw@pennwell.com, Editor, Apr. 26, 2012, Internet article at: http://www.vision-systems.corn/articles/print/volume-10/issue-10/t . . . , (3 pages).

PCT International Preliminary Report on Patentability for PCT/US2013/039318 mailed Dec. 18, 2014.

PCT International Preliminary Report on Patentability and Written Opinion (dated Dec. 18, 2014), International Application No. PCT/US2013/039318, International Filing Date May 2, 2013, (12 pages).

* cited by examiner

SYSTEM AND METHOD FOR AUTOMATIC IMAGE CAPTURE CONTROL IN DIGITAL IMAGING

RELATED MATTERS

This application claims the benefit of the earlier filing date of provisional application No. 61/657,281, filed Jun. 8, 2012.

FIELD

An embodiment of the invention is directed to automatic image capture control in digital imaging and, in particular, switching between binning and non-binning modes while streaming frames from the image sensor. Other embodiments are also described.

BACKGROUND

Binning is a technique used in digital cameras to improve the sensitivity of the camera when the scene is under a low light condition. Binning involves combining at least two pixels into a single pixel that as a result is more sensitive to light in the scene, where this combining is typically performed prior to readout and digitizing of the new pixel signal. As a result, the photo-generated charge carriers of the two or more pixels accumulate, which improves signal to noise ratio, thereby enabling higher quality image recording of scenes that have relatively low light. A further advantage of binning is higher image repetition rate or image recording frequency, also referred to as capture frame rate, due to a lower spatial resolution. In other words, there are fewer new pixels being read and digitized, which enables the frame rate to increase. Binning, however, does have some disadvantages. There is a reduction in spatial resolution due to the combining of pixels. In addition, the combination of the pixels may not be symmetrical, so that, for example, unequal numbers of pixels in the x and y direction are combined. This results in distortion and requires digital image processing to correct. A further concern arises when the image sensor is operating in streaming mode and the sequence of frames that are being output by the sensor are processed and then displayed to the camera's user by an electronic view finder. This is also referred to as the preview mode of operation. The particular concern here is the risk of dropping too many frames when switching or transitioning between binning mode and non-binning mode. For instance, while a camera may be configured to run at a particular frame rate in streaming mode, for example, 15 frames per second, enough image buffers need to be allocated in main memory so that the frames do not start overwriting each other or are not "held up" at the sensor. Usually, a direct memory access facility is provided for use by the image sensor output interface, to rapidly stream its frames directly to the allocated image buffers in memory. To avoid missing or dropping frames, a larger number of memory buffers may be allocated. Alternatively, system latency may be reduced such that the frames are "removed" from the buffers more quickly. A further option is to restrict the amount of image signal processing (ISP) enhancement that is being performed by an ISP pipeline upon the raw frames (that have been written into the image buffers). Finally, the processing power of the ISP pipeline buffer may be increased. In most instances associated with consumer grade electronic cameras that use CMOS sensors, however, it is typically unavoidable that at least one frame will be dropped or missed during a transition between binning and non-binning. This is at least partly due to the image sensor using an electronic rolling shutter (rather than a global shutter), such that at any given instant in time, there are two successive frames being captured by the sensor. A challenge therefore is to keep the number of dropped frames as low as possible, thereby contributing to smoother moving pictures shown to the user during preview.

SUMMARY

A method for automatic image capture control in a digital imaging system takes advantage of binning mode to improve sensitivity under low light conditions, even without the use of a flash. The image sensor is configured into a binning mode, such as, for example, 2×2, and the resulting output frames that are produced in streaming mode are then up-sampled (e.g., by a factor of two in the case of 2×2 binning mode) using an image signal processing (ISP) pipeline backend scaler, to recover the original full frame resolution of the image sensor. The transition between non-binning and binning modes may be performed dynamically, i.e. while the sensor continues to operate in streaming mode. The mode change between non-binning and binning may be incorporated into an automatic exposure control process that is at a relatively low layer, relative to, for example, viewfinder, video recorder, and still recorder processes, making the transition between binning and non-binning transparent to not just the end user but also to higher layer camera applications.

To help limit the number of frames being missed or dropped during the transition between modes, the following method for transition between modes may be used. First, an image buffer is initialized to store a digital image produced by the image sensor, where a region in memory is allocated for the image buffer that is large enough to store a full resolution frame from the sensor. The image sensor is configured to operate in non-binning streaming mode. Next, non-binned streaming frames from the image sensor are then processed by the ISP pipeline, in the image buffer. Next, while the non-binned frames are being displayed in preview, the image sensor is reconfigured to operate in binning streaming mode, such that binned frames are streamed and then processed by the ISP pipeline in the image buffer, but without allocating a smaller region in memory for the image buffer. In other words, even though there is a significant reduction in size of each frame in binning mode, for example, by a factor of two or more, the region in memory that has been allocated for the image buffer is not made smaller but rather may be kept the same. This allows higher layer camera software (including, for example, a preview module, a video recorder module, or a still picture module) to remain essentially unconcerned with the mode transitions. In a further embodiment, the transition between modes may be made even more transparent to the higher layer software, by also upscaling the binned frames in the image buffer, during preview, prior to the frames being read for writing to the display. In that way, the higher layer software that will also be operating on the frames that have been processed by the ISP pipeline can rely on the frames having an essentially fixed resolution, thereby simplifying their own memory management task.

When a decision is made that the image sensor should be transitioned from binning mode back to non-binning mode, because the image buffer was originally allocated a sufficiently large region that could store a full resolution sensor frame, there is no need at that point to reallocate a larger region in memory for the image buffer. This helps reduce the overall latency in reconfiguring for non-binning mode, which in turn helps maintain transparency of the dynamic mode switching process to higher layer camera or image processing applications, while at the same time helping reduce the number of dropped frames during mode switching.

In another embodiment of the invention, the mode switching process is "motion-aware" in the sense that the mode switching between binning and non-binning occurs only if detected camera panning is below a threshold. In other words, if a control module detects that the camera is being panned by its user (e.g., either being rotated about a vertical or horizontal axis, for example, or being translated along a plane), then the image sensor is not reconfigured between binning and non-binning, but rather remains in its current mode, until the detection indicates that the camera panning has dropped to below a certain threshold such that the camera is deemed stable. This helps reduce the likelihood that dropped frames will be visible to the user during preview, particularly when there is a lot of motion between the camera and the scene. By a similar token, when the scene being captured in the streamed frames is deemed to be static, then a mode transition between binning and non-binning is allowed to occur at will. This renders the mode switching very smooth and hardly noticeable from the standpoint of the user or photographer, while at the same time, improving the image quality during preview (as well as during video recording and still capture).

In another embodiment, after the image sensor has been configured to operate in binning mode, and binned streaming frames are processed from the image sensor that capture a scene, during preview, a shutter release command is received. In that case, a determination has also been made that a strobe or flash illumination may be needed for either the still capture or video recording of the scene. In that case, a pre-flash sequence is performed to determine one or more image capture parameters that relate to the effectiveness of illumination of the scene during an upcoming main flash sequence. The image sensor is then reconfigured, during the pre-flash sequence, to operate in non-binning mode (based on the determined image capture parameters). Non-binned frames are then processed during the main flash sequence, leading to either a video recording containing frames from the main flash sequence, or a still picture taken from the main flash sequence. The image capture parameters that have been determined during the pre-flash sequence may provide an estimate of the distance to an object in the scene. When the object distance is found to be short, the image sensor is reconfigured from binning to non-binning mode, where this follows the understanding that the main flash sequence will likely be effective in properly illuminating the scene and as such binning mode is not necessary. On the other hand, when the object distance is found to be long, then the understanding is that the main flash is not likely to be effective in properly illuminating the object so that a transition from non-binning to binning mode will be beneficial.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
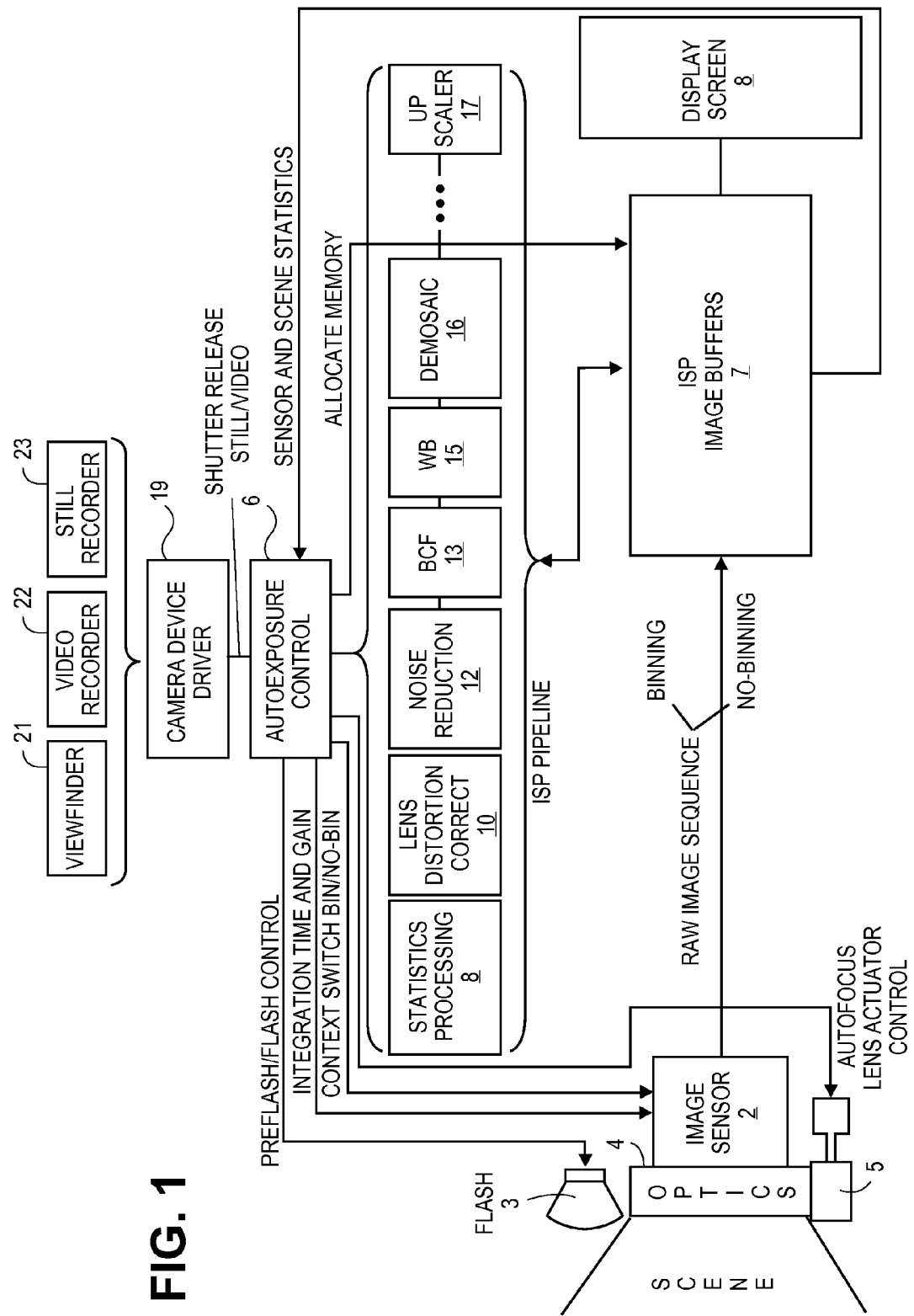
FIG. 1 is a block diagram of a digital camera system.

FIG. 1 is a block diagram of a digital camera system in which a process for automatic image capture control, in accordance with an embodiment of the invention, may be performed. In one embodiment, the process may be performed by a processor running an autoexposure control module 6 and firmware for an image signal processing (ISP) pipeline. The operations may be performed by a suitably programmed image signal processor, which may be a dedicated microprocessor that is designed for the specialized tasks involved in image processing.

The camera system may be integrated into a consumer electronics device such as a desktop personal computer, a smart phone, a tablet computer, or an office/home entertainment system. The camera system has at least the following higher layer camera routines. An electronic viewfinder module 21 serves to read streaming frames that are output by an ISP pipeline, and display them to a user through a display screen 8. This is also referred to as preview, where the user can examine an approximation of the scene as it will be captured when she actuates the shutter release. As an example, preview can display in essence a "low speed" video of the scene, e.g. at about ten (10) to fifteen (15) frames per second, so as to reduce power consumption yet still provide the user with a smooth captured look at the scene while she pans the camera. A video recorder module 22 serves to process the output streaming frames from the ISP pipeline, into a digital video file, e.g. converts them into an MPEG format, that is then stored in non-volatile memory. A still recorder 23 serves to process one of the output frames from the ISP pipeline into a digital still picture file that is stored in non-volatile memory, e.g. converts the frame into a JPEG file.

In between the autoexposure control 6 and the upper layer camera functions of the viewfinder 21, video recorder 22, and still recorder 23, may be a camera device driver 19. The camera device driver 19 may be a program that is part of an operating system running in the device in which the camera system is integrated, for example, the iOS™ operating system by Apple Inc. The camera device driver is a hardware driver program that provides an interface to the upper layer software (such as the viewfinder, video recorder and still recorder routines), to use the camera system hardware. For example, the camera device driver 19 may expose an application programming interface through which a higher layer camera application can signal a shutter release command, select still capture or video recording, and provide manual (user controlled) flash and zoom. The camera device driver 19 may, in some instances, be a program that is executed by a different processor than the one used for the ISP pipeline and the autoexposure control 6, e.g. a system on a chip SoC or an applications processor in the case of a multi-function device such as a smart phone or a tablet computer.

The autoexposure control 6 supplies control signals to several lower layer hardware components of the camera, including an image sensor 2 (e.g., a CMOS image sensor that provides digitized output frames in a streaming mode), an autofocus lens 5, optics 4 (for through-the-lens imaging), and a strobe or flash 3. The control signals may be for autofocus lens actuator control, zoom lens control, image sensor integration time, analog and/or digital pixel signal path gain, pre-flash and main flash sequences, and a context switch signal that may include commands to enter binning and no-binning modes while streaming. The image sensor 2 is capable of pixel binning, such as by averaging or by summing the charge carrier signals from two or more pixels. This combining may occur on a per color basis, or it may occur for a group of pixels that may be deemed a full color combination. The binning options may include binning two pixels together, or four pixels together, or other combinations of pixels, into a single, combo pixel. In both binning and non-binning mode, the image sensor 2 outputs a digitized raw image sequence (streaming frames) at a specified frame rate, where each frame has the full sensor resolution (non-binned mode) or a reduced resolution (as specified by the particular binning mode). The image sensor 2 may be able to perform an internal hardware context switch for rapid transitions between its binning and non-binning modes while streaming.

The raw image sequence (streaming raw frames) are transferred out by the image sensor 2, into one or more ISP image buffers 7. An image buffer 7 is an allocated storage region in memory that is sufficient to store a full resolution sensor frame. The allocated region in memory may be within dynamic random access memory, or static random access memory, which may be of the volatile variety, or it may be within flash memory. The image buffers 7 may be initialized, for example, by the automatic exposure control 6, so that the streaming frames can be written into them by the sensor 2, e.g. via direct memory access, DMA, where the ISP pipeline then performs its various image processing operations for the most part upon the buffered frames.

The ISP pipeline stages may include at least the following. In statistics processing 8, the image data (pixels) in one or more frames are analyzed, such as using statistical signal processing techniques, to determine various parameters used for image capture, namely defective pixels (and their correction), lens defects, black level compensation, motion history, and scene brightness. The determination of some of these parameters may be supplemented by input from other sensors or other processes running in the device of which the camera system is a part or to which it is linked, for example, data from a position, orientation or movement sensor such as an accelerometer or a gyro, a dedicated proximity sensor, and/or a dedicated ambient light sensor. The result of such statistics processing may be stored (as sensor and scene statistics) along with the image frames, inside the image buffer 7, or alternatively they may be provided to the autoexposure control 6 directly, that is in real-time.

The ISP pipeline may also include a lens distortion correction module 10 that makes corrections for defects such as vignetting, blemishes, and lens shading.

Another stage in the ISP pipeline that performs a useful function upon the frames stored in the image buffer 7 is a noise reduction module 12. In particular, the noise reduction may involve temporal filtering, also referred to as inter-frame filtering, such as averaging two or more frames based on motion and brightness characteristics, in order to remove imaging noise. The temporal filtering may be adaptive, based on motion and brightness characteristics. For instance, when object motion is high the filter strength may be reduced in order to avoid the appearance of "trailing" or "ghosting" artifacts in the resulting processed image. On the other hand, the filtering strength may be increased when there is little or no motion being detected. Additionally, the filtering strength may be adjusted based upon brightness data or luma data. For example, as scene brightness increases, filter artifacts may become more noticeable to the human eye. In that case, the filtering strength may be reduced when the pixels indicate a high level of brightness.

Next in the ISP pipeline, as shown in FIG. 1, is a binning compensation filter (BCF) 13. The BCF is only turned on or used when the raw image sequence streaming from the image sensor 2 are binned frames (as opposed to non-binned frames). The BCF may process pixels of a given frame to compensate for non-linear placement of the binned color samples, so that subsequent image processing operations in the pipeline, for instance demosaicing, that depend on linear placement of the color samples, can operate correctly.

Next in the sequence may be an automatic white balance (WB) module 15 which may perform further adjustments on the pixels of each frame, for example, using a color correction matrix.

At some point in the ISP pipeline, a demosaicing module 16 is needed, assuming, of course, the image sensor 2 has, for example, a color filter array (e.g., a Bayer pattern) that produces individual color component pixels (that are assigned to separate color components, respectively) rather than providing full color pixels.

Towards the end of the ISP pipeline, although not necessarily in the last stage, is a backend upscaler 17, which serves to upscale or up-sample each binned frame that is to be output by the ISP pipeline, so as to recover the full frame resolution of the image sensor 2. As with the BCF 13, the upscaler 17 is turned off or skipped when the image sensor 2 is operating in non-binning mode.

As explained above, the initialization of an image buffer 7, by, for example, the autoexposure control 6, for storing a frame produced by the image sensor 2, is performed by allocating a region in memory that is large enough to store a full resolution frame from the image senor 2. This buffer size may be kept unchanged during both binning and non-binning modes. Once the buffered streaming frames have been processed by the ISP pipeline, including the backend upscaler 17 in the case of binning mode, the frames are then prepared for display in preview, by the electronic viewfinder 21. The autoexposure control 6 is also responsible for making the decision as to whether or not the image sensor 2 should be reconfigured into binning or non-binning mode, by signaling its decision through a context switch command that is given to the image sensor 2.

Figure 2:
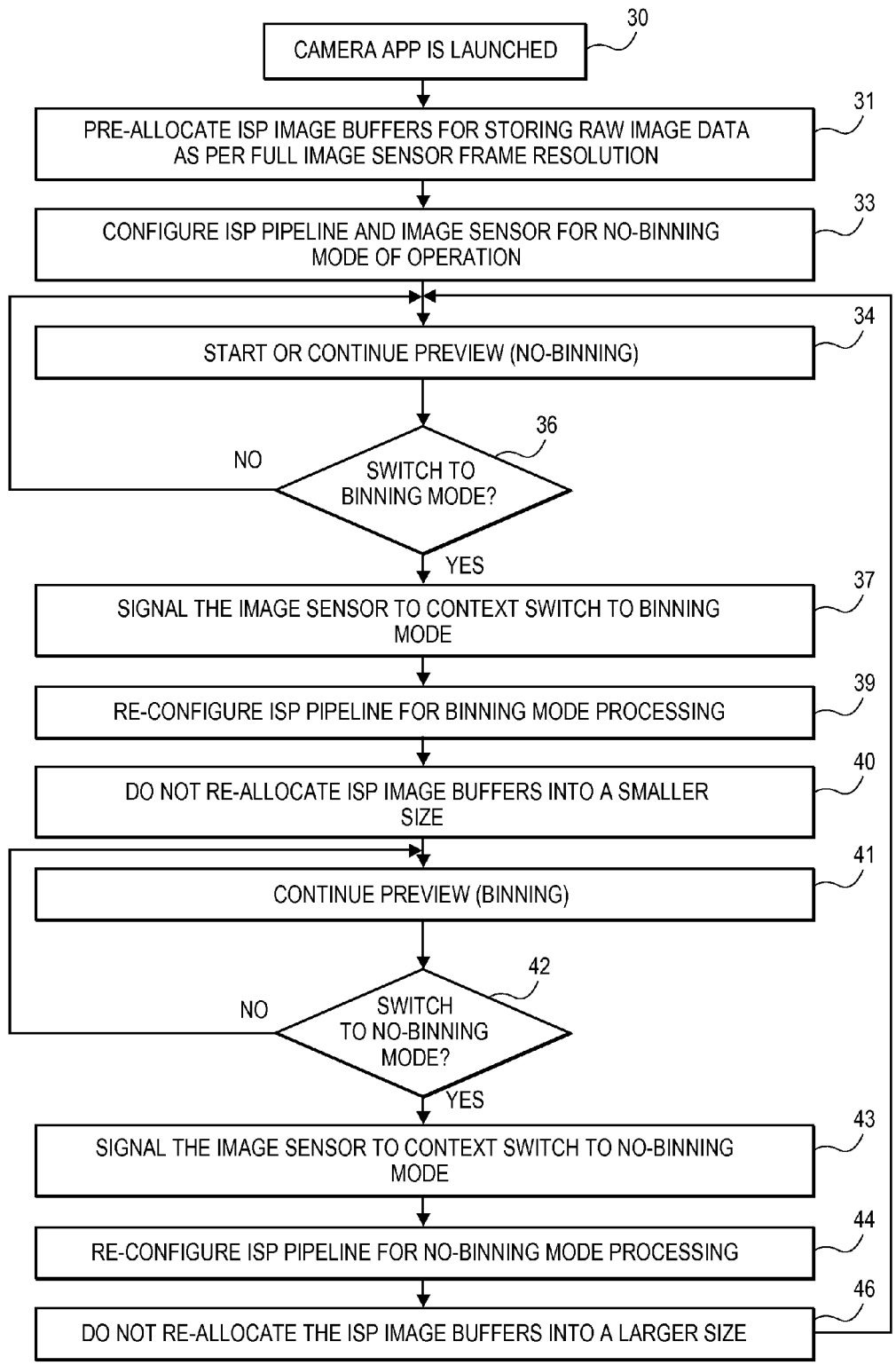
FIG. 2 is a flow diagram of a process for automatic image capture control digital imaging.

A process for automatic image capture control using, for instance, the digital imaging system of FIG. 1 (or any other suitable digital imaging system that has the needed functionality) is depicted in FIG. 2. In this case, the camera system may be integrated within a multi-function device such as a laptop computer, a smart phone, a desktop computer or a tablet computer, or other consumer electronics device, including a device that may be integrated in a vehicle. The process begins with a camera application being launched (block 30). In some cases, the camera application may be operating as a background task and as such does not require its shutter release commands to be manually input by the user. In other instances, the camera system is part of a dedicated, professional digital camera. Next, operation proceeds with block 31 in which one or more ISP image buffers are allocated (e.g., for the first time), where each buffer can store the image data of a frame that is at full image sensor frame resolution. In some cases, when the streaming mode of operation for the image sensor is running at a relatively high frame rate, several image buffers may need to be allocated to form a queue. The actual allocation of regions in memory may be performed, for example, by autoexposure control firmware (part of the autoexposure control module 6—see FIG. 1).

The process continues with configuring the ISP pipeline and the image sensor 2 for a non-binning streaming mode of operation (block 33). Thus, referring to FIG. 1, in the ISP pipeline, certain stages may be disabled including the BCF 13 and the upscaler 17, for no-binning mode. Operation then continues with preview, where the electronic viewfinder 21 is first launched (or otherwise continues running) to pull frames from the backend of the ISP pipeline and prepares and submits them to the display 8 according to a set frame rate, e.g. slow video at about 10-15 frames per second.

At some point during preview, the conditions in the scene being captured may be such that it would be desirable to switch to binning mode. The decision in block 36 may be made to switch to binning mode, when the brightness or scene lighting level has dropped to below a threshold. Other criteria may be used in addition or as an alternative, to find that it is time to switch to binning mode. At that point, operation continues with blocks 37-40, where the image sensor 2 is signaled to context switch into binning streaming mode, and the ISP pipeline is reconfigured for processing binned frames (e.g., by enabling one or more stages such as the binning compensation filter and the backend upscaler, and by recognizing the smaller image data set being written into the image buffers 7 from the sensor 2). In addition, the preview continues (block 41) in binning mode, without reallocating the ISP image buffers 7 into a smaller size (block 40).

In some instances, the ISP image buffers 7 that are used to receive the streaming frames being output from the image sensor 2 remain essentially unchanged in size, so that no additional reallocation of a significant amount of storage within the memory is needed. This is in contrast to a more conventional technique where the ISP image buffers 7 are at this point reallocated into a smaller size, because the binned frames will be of substantially smaller resolution (e.g., smaller by a factor of 2 or more).

The preview may continue (in block 41) with the same size ISP image buffers 7, until a decision is made to switch back to no-binning mode (block 42). For example, if the scene lighting resumes a bright level, then processing should be changed to no-binning mode, for example, to avoid saturating the pixels that are being binned. Upon such a decision being made, the process continues with blocks 43-46 where the image sensor is signaled to context switch back to no-binning mode, the ISP pipeline is reconfigured for no-binning mode processing (e.g., by disabling the binning compensation filter and the upscaler, and by recognizing the larger image data set being written into the image buffer 7 from the image sensor 2), but there is no need to reallocate the ISP image buffers 7 into a larger size.

Thus, the image buffers 7 may remain the same size throughout preview, and in particular at a size that is sufficient for storing full resolution sensor frames, during transitions between binning and non-binning modes. This process makes it easier for higher level software such as the viewfinder 21, video recorder 22 or still recorder 23, to manage the transitions between binning and non-binning, by in effect making those transitions transparent to the higher layer software. In addition, there being no need to reallocate storage regions in memory during mode transitions, the number of dropped frames may be reduced, as the ISP pipeline is able to quickly transition its processing, between the two modes. As to the higher level software, this may be designed to accept a single size or resolution for the streaming frames, regardless of whether binning or non-binning mode is taking place. That is because the backend upscaler 17 ensures that, during binning mode, the streaming frames being made available by the ISP pipeline to higher layer software have already been upscaled into the full resolution frame size.

Figure 3:
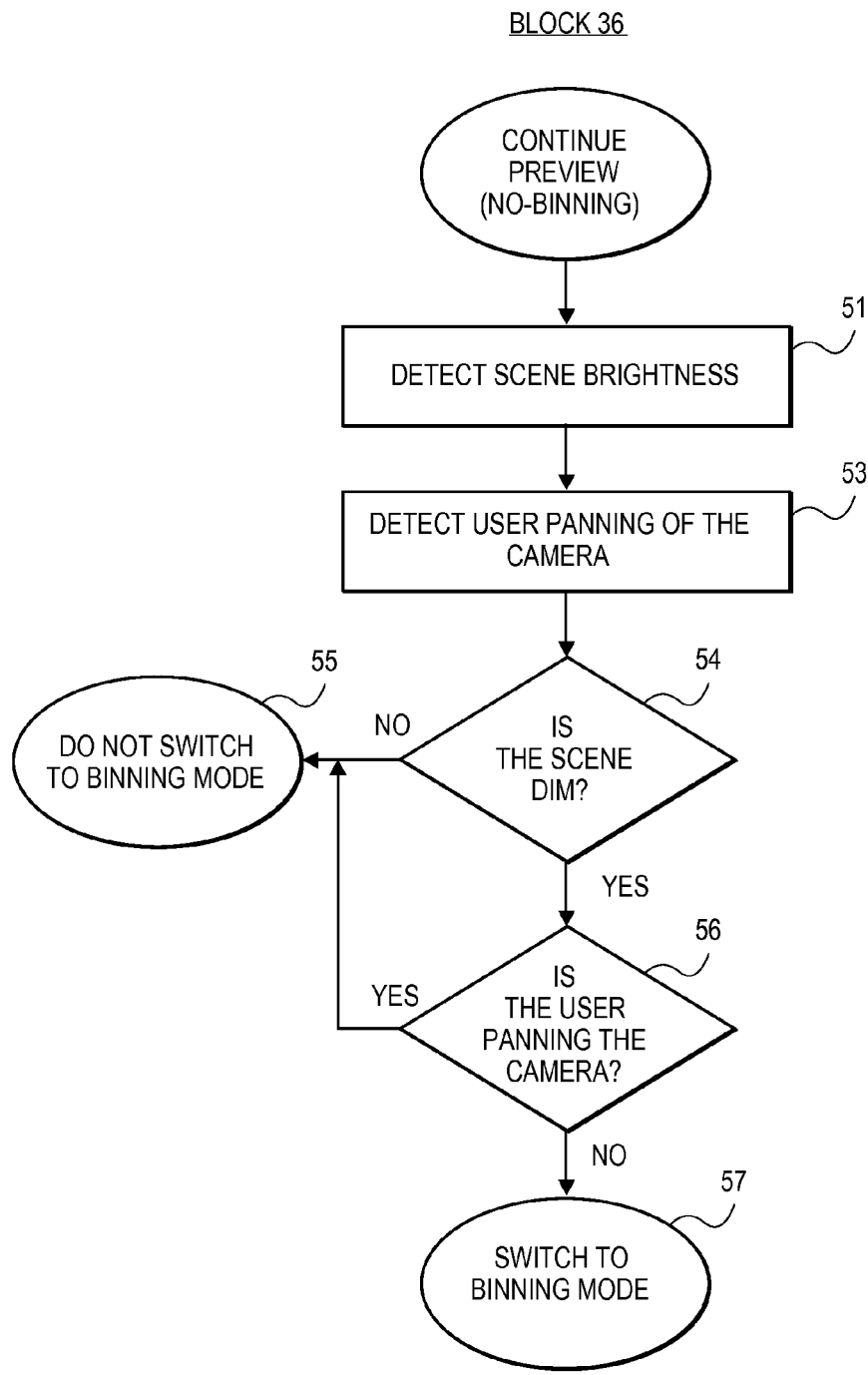
FIG. 3 is a flow diagram of a process for making a decision to switch to binning mode.

Turning now to FIG. 3, this is a flow diagram of a process that may be used in block 36 of FIG. 2, for making the decision to switch to binning mode. The process in block 36 is arrived at while continuing preview, in the no-binning streaming mode. During such preview, scene brightness is detected (block 51) and user panning of the camera is also detected (block 53). This monitoring of the scene brightness, and the level at which the user is panning the camera, can be performed by the autoexposure control module 6 (see FIG. 1) using, for example, sensor and scene statistics that have been provided by the frontend of the ISP pipeline for each frame. To determine whether or not a user is panning the camera, any one of several conventional techniques may be used, including one that is based solely on, for example, tracking an object in the streaming frames using digital image processing, to detect the changes between an object and the background as the streaming frames continue to be processed during preview. As an alternative or in addition, external sensors may be used such as ambient light sensors, proximity sensors, position orientation or movement sensors, to detect the scene brightness and whether the user is panning the camera or simply holding the camera relatively still in one spot. The process continues with block 54 where if the scene has gone dim or the brightness has dropped below a predetermined threshold, then a further test is performed before deciding that there should be a switch to binning mode. In particular, block 56 requires the process to determine whether the user is panning the camera, or in other words whether camera panning remains below a given threshold. If the camera panning remains below a threshold, that is the user is not panning the camera, then block 57 is reached where the appropriate control signals are asserted to switch to binning mode. On the other hand, even if the scene has gone dim, if the user happens to be panning the camera or the camera panning remains above a threshold, then the ISP pipeline and image sensor should not be switched to binning mode (block 55). This process helps ensure that the benefits of switching to binning are not outweighed by its weaknesses, such as dropped frames, particularly when the camera is being panned. That is because the inevitable dropping of frames during the switch to binning mode is likely to be much more apparent to the user (in preview) when the camera is being panned. Once the camera has stabilized, however, then the decision in block 56 allows a switch to binning mode (provided, of course, that the scene is still dim), which would result in a benefit of improved image quality even without a flash.

Figure 4:
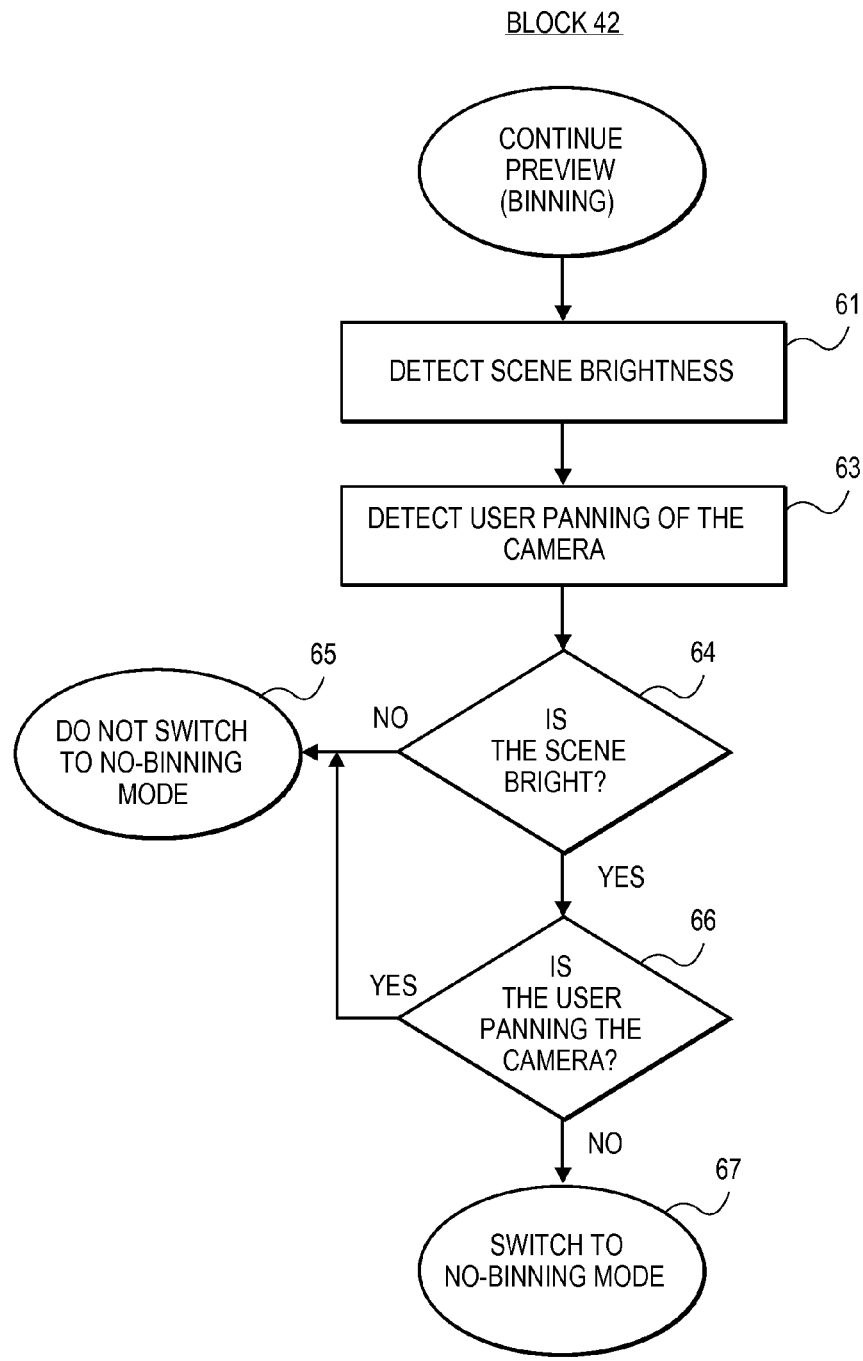
FIG. 4 is a flow diagram of a process for making a decision to switch to non-binning mode.

The motion aware decision making for transitioning between binning and non-binning mode has a counterpart process that is depicted in FIG. 4. This process is an example of block 42 in FIG. 2, which is the decision to switch from binning to no-binning mode. Once again, the process begins with continuing in preview, but this time while binning. Scene brightness is detected (block 61), as well as user panning of the camera (block 63), which may be in a similar manner as described above in connection with FIG. 3. If the monitored or detected data reveals that the scene brightness has risen above a threshold (block 64) and that camera panning is below a threshold such that the user is deemed to no longer be panning (block 66), then the image sensor should be reconfigured to operate in no-binning streaming mode (block 67).

When the above processes of FIG. 3 and FIG. 4 are implemented together during a streaming frame sequence in preview, it can be seen that the image sensor is reconfigured between binning streaming mode and no-binning streaming mode only if detected camera panning is below a threshold. In addition, the image sensor is not reconfigured (between binning and no-binning) when detected camera panning is above a threshold.

Figure 5:
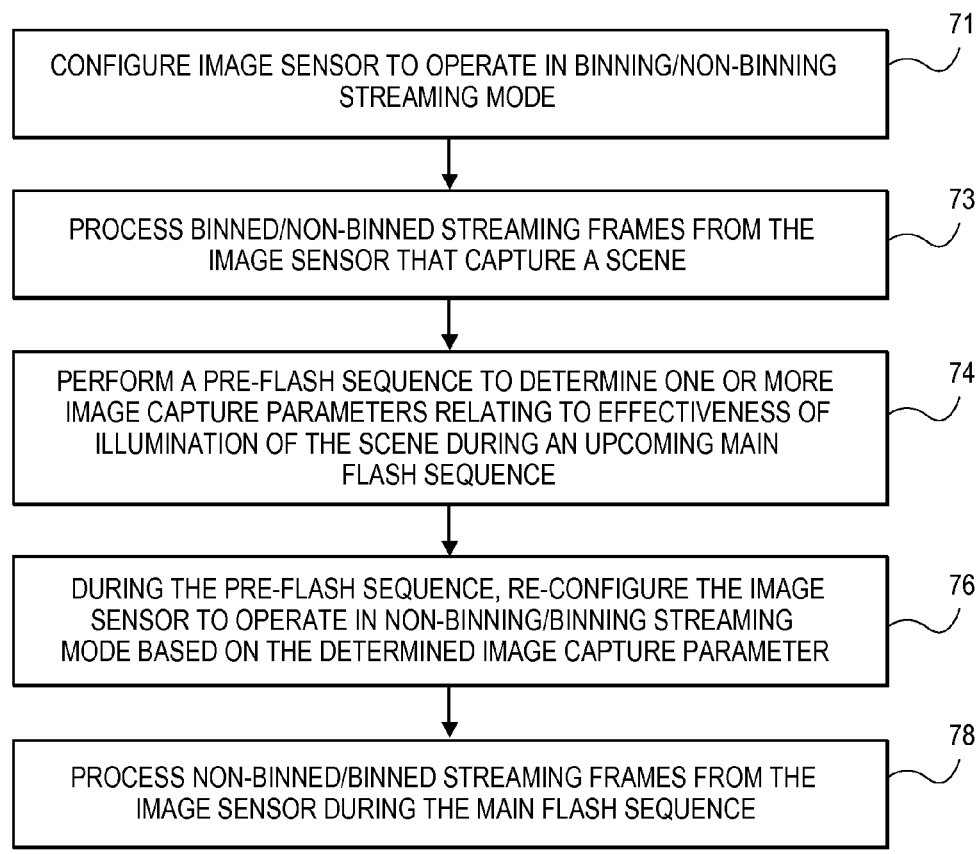
FIG. 5 is a flow diagram of a process for automatic image capture control involving a flash sequence.

Turning now to FIG. 5, this is a flow diagram of a process for automatic image capture control involving a strobe or flash. The image capture control process here involves a preflash sequence followed by a main flash sequence. In the pre-flash sequence, the automatic exposure control module 6 (see FIG. 1) determines one or more image capture parameters that relate to the effectiveness of illumination of the scene during an upcoming main flash sequence. These image capture parameters may include one or more of the following: pre-flash frames statistics, integration time, analog and digital pixel signal path gain values, estimates of the distance between the camera to an object in the scene, strobe or main flash intensity, and scene brightness level. Of course, the actual effect of the main flash on the scene may not be observed or detected by image capture circuitry until it occurs. As such, the electronic device may estimate the effect of the main flash on the scene using the above-identified parameters and/or other streaming frame statistics or sensor statistics, during the pre-flash sequence. The pre-flash sequence may include a time interval during which a source of illumination, such as the same lamp that will be used to provide the illumination during the main flash sequence, is used to illuminate the scene, albeit typically at a lower intensity than the main flash, while a few frames are processed by the ISP pipeline and analyzed. The exposure control module 6 may then extrapolate certain main flash image capture statistics that are expected to occur during the main flash sequence, where these extrapolated statistics are then used to determine the image capture control parameters to be applied during the main flash sequence. Thus, for instance, one or more of the parameters computed during the pre-flash sequence may be adjusted (e.g., integration time, analog or digital pixel signal path gain, and flash lamp intensity) to be applied in the main flash sequence.

With the above in mind, referring back to the flow diagram of FIG. 5, operation begins with configuring the image sensor to operate in binning streaming mode, or alternatively beginning with non-binning streaming mode (block 71). At this point, the streaming frames may also be processed according to preview (by the electronic viewfinder 21). Some time during preview, a command is given (e.g., manually by the user) to begin the recording of a video session, which invokes the video recorder 22, or to take a still picture which invokes the still recorder 23 (see FIG. 1). This may be a shutter release command that is given to the camera device driver 19, which in turn provides the command to the autoexposure control 6. Operation then continues with block 73, where binned streaming frames from the image sensor are processed that capture a scene. Note that block 73 also refers to the other scenario where non-binned streaming frames are being processed (where the image sensor has been configured into no-binning streaming mode).

Next, a pre-flash sequence is performed (block 74) by the automatic exposure control module 6, to determine one or more image capture parameters or image capture statistics, relating to the effectiveness of illumination of the scene during the upcoming main flash sequence. Also during the preflash sequence, a decision is made as to whether to reconfigure the image sensor (and the ISP pipeline—see FIG. 1) to switch between non-binning and binning streaming modes, based on the determined image capture parameters or scene statistics (block 76). For instance, if the estimated distance to an object in the scene is short, then it may be expected that the main flash will be effective in properly illuminating the object, and as such the image sensor (and the ISP pipeline) should either remain in no-binning mode or be transitioned into it. On the other hand, if during the pre-flash sequence, the estimated object distance is long, then it may be expected that the main flash will not be effective in properly illuminating the object, such that the image sensor (and the ISP pipeline) should either remain in binning mode or be transitioned into it.

After reconfiguring the image sensor to operate in nonbinning streaming mode (or, alternatively, binning streaming mode, as the case may be) during the pre-flash sequence, non-binned streaming frames (or, alternatively, binned streaming frames) are processed during the main flash sequence (in block 78). Here, at least some of those nonbinned streaming frames (or, alternatively, binned streaming frames) were captured by the image sensor while the scene was under illumination by the main flash.

Figure 6:
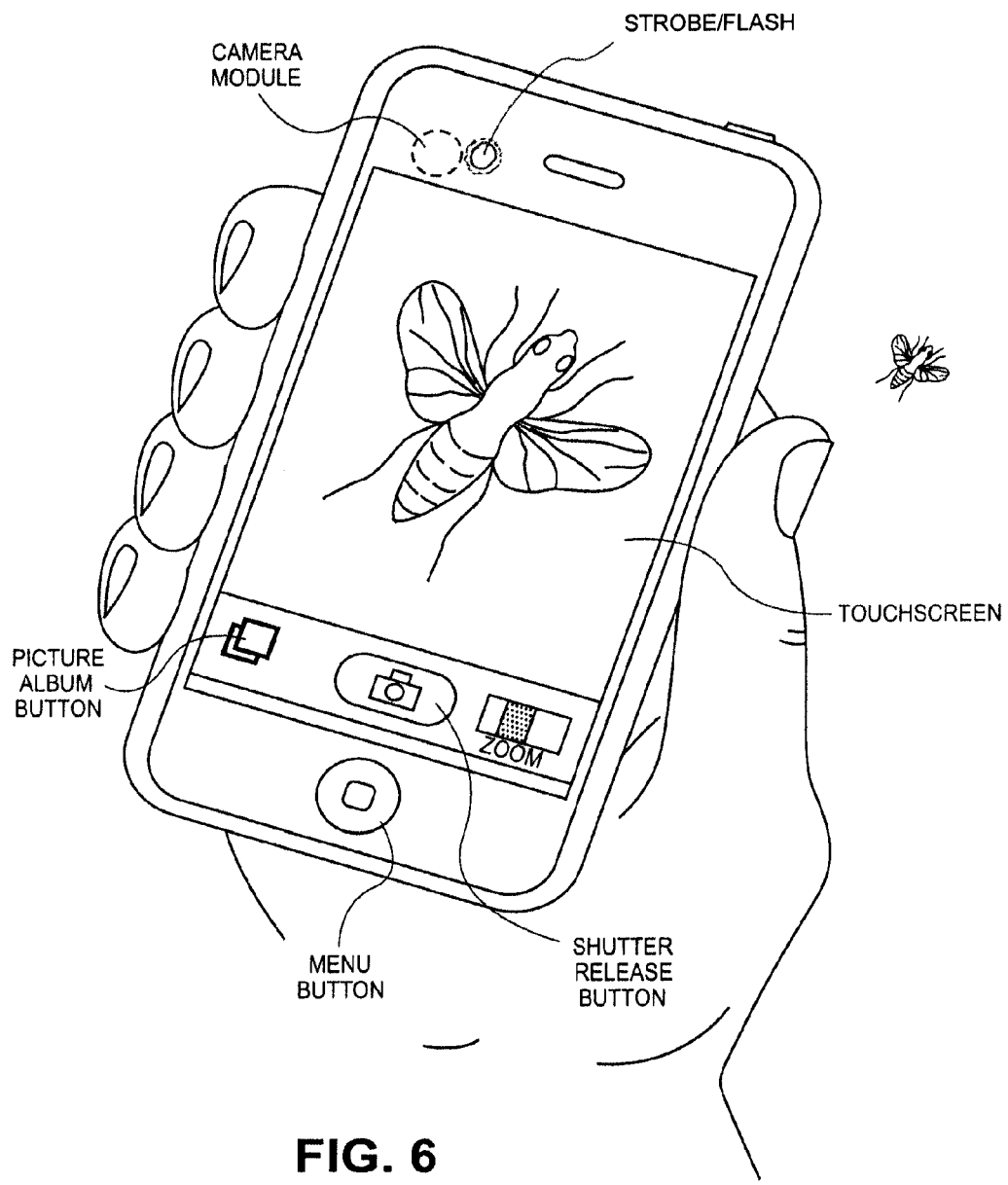
FIG. 6 shows a portable handheld consumer electronics device being held in the hand of its user and operating in camera preview.

FIG. 6 shows a portable handheld consumer electronics device being, in this case, a smart phone in which a digital camera system, in accordance with an embodiment of the invention can be integrated. The device may alternatively be any one of several different types of portable consumer electronic devices that can be easily held in the user's hands during normal use, such as a tablet computer. The device has an external housing in which are integrated several components that include a camera module, a touchscreen, and a menu button. The touchscreen (which includes the display screen 8—see FIG. 1) has a display area in which the streaming frames from the image sensor that capture a scene or an object (here a flying insect) are being displayed during preview. The touchscreen is viewable by the user or photographer who is using the camera system to not just examine the recorded still and/or pictures but also to enter manual commands. The touchscreen in this example includes a shutter release virtual button, a picture album virtual button, and a zoom virtual slider. Of course, as an alternative to a touchscreen, some or all of the virtual buttons may be instead implemented using physical buttons.

The camera module may contain the through-the-lens imaging optics 4 (see FIG. 1), the image sensor 2, and the autofocus lens 5 all integrated within the same module assembly. The flash 3 may or may not be integrated with the module. As suggested above, the raw image sequence provided by the image sensor 2 in binning or non-binning streaming mode will be transferred to the ISP image buffers 7 using conventional image sensor interfaces. An electrical bus, for example, using a flex connector or other printed circuit board connector, may be used to deliver the streaming raw image sequence to memory integrated circuits. In addition, other electrical buses may connect the memory to an ISP processor that has been programmed to perform the ISP pipeline stages and the autoexposure control processes described above in connection with FIG. 1. A separate applications processor or system on a chip (SoC) may also be provided within the housing of the portable device. The applications processor or SoC may be programmed with an operating system that may include the camera device driver 19. There may also be higher layer programs running on the SoC or the applications processor, such as a digital camera application program, which may have modules whose functions are similar to those of the viewfinder 21, video recorder 22, and still recorder 23. All of the above may be integrated within the housing of the portable device as it is depicted in FIG. 6. As an alternative, some parts of the camera system, such as the camera module, may be in a separate housing that is connected by a wireless or wired communications link to the SoC or applications processor that is in the housing of a "host" device.

The various embodiments of the invention described above in connection with FIGS. 1-5 concerning the transition between binning and non-binning modes are particularly desirable when the camera system is integrated as part of a complex, portable multi-function device such as a smart phone, or a tablet computer, where these are consumer electronics devices that are battery powered and therefore have limited processing and storage capabilities despite recent advances in those technology areas. It is difficult to ensure smooth and rapid transitions between binning and non-binning modes in such portable consumer electronics devices, particularly when the devices are being used in camera preview as depicted in FIG. 6.

As explained above, an embodiment of the invention may be a machine-readable medium or storage circuitry (such as microelectronic memory) having stored thereon instructions, which program one or more data processing components (generically referred to here as a "machine" or a "processor" or "data processing circuitry") to perform the mode transition decision making operations and the digital image processing operations described above, in connection with the autoexposure control module 6 and the ISP pipeline. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In accordance with an embodiment of the invention, a method for automatic image capture control in digital imaging, comprises: configuring an image sensor to operate in non-binning streaming mode; processing non-binned streaming frames from the image sensor; while the non-binned streaming frames are being displayed in preview, detecting scene brightness and camera panning; and reconfiguring the image sensor to operate in binning streaming mode, and then processing binned streaming frames from the image sensor, in response to having detected that the scene brightness has dropped below a threshold and camera panning remains below a threshold.

In another embodiment, an article of manufacture comprises a machine-readable storage medium having stored therein instructions that program a machine to configure an image sensor to operate in binning streaming mode, and process binned streaming frames from the image sensor, and wherein while the binned streaming frames are being processed for display in preview mode, the programmed machine is to reconfigure the image sensor to operate in no-binning streaming mode and then process non-binned streaming frames from the image sensor, and wherein the machine is programmed to reconfigure the image sensor between binning streaming mode and no-binning streaming mode, only if detected camera panning is below a threshold, and to not reconfigure the image sensor between binning streaming mode and no-binning streaming mode when detected camera panning is above a threshold.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For instance, in FIG. 1, the various stages of the ISP pipeline are shown in a particular order. However, it should be recognized that some of these stages may be performed in a different order or sequence, particularly those whose image processing functions are linear in nature. Also, although the above-described techniques for performing binning/non-binning mode transitions can be applied in a wide range of digital camera systems, their application is particularly effective in portable personal consumer electronics devices such as smart phones and tablet computers where a relatively large display area is provided for use by an electronic viewfinder to perform preview. An aim in that particular scenario is to provide a smooth transition between binning and non-binning modes, so that the transitions may appear essentially transparent to the user, by virtue of having a fewer or limited number of missed or dropped frames. The above description is nevertheless to be regarded as illustrative instead of limiting.

What is claimed is:

1. A method for automatic image capture control in digital imaging, comprising:
   initializing an image buffer to store a digital image produced by an image sensor, by allocating a region in memory included in a portable handheld device for the image buffer that is large enough to store a full resolution frame from the image sensor;
   configuring the image sensor to operate in non-binning streaming mode;
   processing non-binned streaming frames from the image sensor, in the image buffer; and
   while the non-binned streaming frames are being displayed in preview, reconfiguring the image sensor to operate in binning streaming mode and then processing binned streaming frames from the image sensor, in the image buffer, without allocating a smaller region in memory for the image buffer.

2. The method of claim 1 wherein processing binned streaming frames comprises:
   up scaling the binned streaming frames in the image buffer during preview and prior to the frames being read for writing to a display.

3. The method of claim 2 wherein processing binned streaming frames comprises:
   temporal filtering for noise reduction and binning compensation filtering both prior to up scaling the frames.

4. The method of claim 2 further comprising:
   processing one of the up scaled frames in the image buffer into a digital still picture file that is stored in non-volatile memory.

5. The method of claim 2 further comprising:
   processing a series of up-scaled frames taken from the image buffer into a digital video file that is stored in non-volatile memory.

6. The method of claim 1 further comprising:
   detecting scene brightness and camera panning during the preview, wherein said reconfiguring the image sensor to operate in binning streaming mode is in response to having detected that the scene brightness has dropped below a first threshold and camera panning remains below a second threshold.

7. An article of manufacture comprising:
a non-transitory machine-readable storage medium having stored therein instructions that program a machine to allocate a region in memory included in a portable handheld device for an image buffer that is large enough to store a full resolution frame from an image sensor, configure the image sensor to operate in binning streaming mode, and process binned streaming frames from the image sensor, in the image buffer, and wherein while the binned streaming frames are being processed for display in preview, the programmed machine is to reconfigure the image sensor to operate in no-binning streaming mode and then process non-binned streaming frames from the image sensor, in the image buffer, without allocating a larger region in memory for the image buffer.

8. The article of manufacture of claim 7 wherein the stored instructions are such that the programmed machine processes binned streaming frames by up scaling the binned streaming frames in the image buffer, during preview and prior to the frames being read for writing to a display.

9. The article of manufacture of claim 8 wherein the stored instructions are such that the programmed machine processes binned streaming frames by temporal filtering for noise reduction and applying binning compensation filtering, both prior to up scaling the frames.

10. The article of manufacture of claim 7 wherein the stored instructions program the machine to detect scene brightness and camera panning during the preview, and wherein the re-configuration of the image sensor to operate in no-binning streaming mode is in response to having detected that the scene brightness has risen above a threshold and that camera panning is below a threshold.

11. The article of manufacture of claim 7 wherein the stored instructions program the machine to reconfigure the image sensor between binning streaming mode and no-binning streaming mode, only if detected camera panning is below a threshold, and to not reconfigure the image sensor between binning mode and no-binning mode when detected camera panning is above a threshold.

12. A digital camera system comprising:
an image sensor that can output streaming frames in binning mode and non-binning mode;
a display screen;
storage containing an image buffer that is large enough to store a full resolution sensor frame, wherein the storage is included in a portable handheld device;
storage containing a camera viewfinder, an auto exposure control, and an image signal processing (ISP) pipeline; and
data processing circuitry to execute the viewfinder, auto exposure control, and ISP pipeline, to read streaming frames from the image buffer that have been processed by the ISP pipeline and process them for display on the display screen, and to signal the image sensor to transition from non-binning mode to binning mode but without reallocating the image buffer into a smaller size.

13. The system of claim 12 wherein the ISP pipeline comprises an upscaler that is to upscale binned streaming frames in the image buffer during preview and prior to the frames being read for display.

14. The system of claim 13 wherein the ISP pipeline is to perform temporal filtering for noise reduction and binning compensation filtering, prior to upscaling the frames.

15. The system of claim 12 wherein the data processing circuitry is to reconfigure the image sensor to operate in no-binning streaming mode in response to having detected, during preview, that scene brightness has risen above a first threshold and that camera panning is below a second threshold.

* * * * *